United States Patent
Srivastava et al.

(10) Patent No.: US 10,116,164 B2
(45) Date of Patent: Oct. 30, 2018

(54) FLEXIBLE CONTROL ARCHITECTURE FOR MICROGRID RESILIENCY

(71) Applicant: Siemens Aktiengesellschaft, Munich (DE)

(72) Inventors: Sanjeev Srivastava, Princeton, NJ (US); Sindhu Suresh, Monroe Township, NJ (US); Paul J. Bruschi, Princeton Junction, NJ (US); Dong Wei, Edison, NJ (US); Parag Patre, North Brunswick, NJ (US); Yaosuo Xue, Monroe, NJ (US)

(73) Assignee: Siemens Aktiengesellschaft, Munich (DE)

( * ) Notice: Subject to any disclaimer, the term of this patent is extended or adjusted under 35 U.S.C. 154(b) by 17 days.

(21) Appl. No.: 15/303,914

(22) PCT Filed: Apr. 21, 2015

(86) PCT No.: PCT/US2015/026740
§ 371 (c)(1),
(2) Date: Oct. 13, 2016

(87) PCT Pub. No.: WO2015/164292
PCT Pub. Date: Oct. 29, 2015

(65) Prior Publication Data
US 2017/0040839 A1  Feb. 9, 2017

Related U.S. Application Data

(60) Provisional application No. 61/982,593, filed on Apr. 22, 2014.

(51) Int. Cl.
*H02J 13/00* (2006.01)
*G05B 15/02* (2006.01)
(Continued)

(52) U.S. Cl.
CPC .......... *H02J 13/0006* (2013.01); *G05B 15/02* (2013.01); *G05F 1/66* (2013.01);
(Continued)

(58) Field of Classification Search
CPC ...... G05B 13/02; H02J 2003/001; H02J 3/08; H02J 3/40; Y02P 80/14
(Continued)

(56) References Cited

U.S. PATENT DOCUMENTS

| | | | |
|---|---|---|---|
| 9,026,260 B1* | 5/2015 | Thornley | H02J 3/00 700/292 |
| 2011/0087384 A1* | 4/2011 | Bose | H02J 3/14 700/295 |

(Continued)

FOREIGN PATENT DOCUMENTS

| | | | | |
|---|---|---|---|---|
| EP | 2600479 A1 * | 5/2013 | | H02J 3/38 |
| WO | 0193405 A1 | 6/2001 | | |
| WO | 20120015508 A1 | 2/2012 | | |

OTHER PUBLICATIONS

Report of Examination dated Jul. 28, 2015; PCT/US2015/026740; Filing Date: Apr. 21, 2015.

*Primary Examiner* — Jason Lin

(57) ABSTRACT

A flexible control architecture for an electrical power microgrid provides resiliency when operating under varying threat levels. The architecture includes a microgrid control layer, an intermediate layer and a component control layer. A contingency level is computed based on conditions of the microgrid such as weather and system state. When the contingency level indicates a low degree of threat, the system operates in a centralized, top-down control configuration. When the contingency level indicates a high degree (Continued)

of threat, the system operates in a decentralized control configuration with the microgrid control layer performing only a monitoring function.

14 Claims, 8 Drawing Sheets

(51) Int. Cl.
    *H02J 3/38*     (2006.01)
    *G05F 1/66*     (2006.01)
    *H02J 3/46*     (2006.01)
    *H02J 3/00*     (2006.01)

(52) U.S. Cl.
    CPC .............. *H02J 3/381* (2013.01); *H02J 3/383* (2013.01); *H02J 3/46* (2013.01); *H02J 2003/007* (2013.01); *H02J 2003/388* (2013.01); *Y02B 70/3216* (2013.01); *Y02E 40/72* (2013.01); *Y04S 10/12* (2013.01); *Y04S 20/221* (2013.01)

(58) Field of Classification Search
    USPC ................ 700/291, 293, 287, 289, 292, 296
    See application file for complete search history.

(56) References Cited

U.S. PATENT DOCUMENTS

| | | | |
|---|---|---|---|
| 2012/0029897 A1* | 2/2012 | Cherian | H02J 3/00 703/18 |
| 2012/0143385 A1* | 6/2012 | Goldsmith | H02J 3/38 700/297 |
| 2012/0175955 A1* | 7/2012 | Carralero | H02J 3/381 307/38 |
| 2012/0229081 A1* | 9/2012 | Kiuchi | H01M 10/44 320/107 |
| 2014/0148960 A1* | 5/2014 | Bhageria | G05B 15/02 700/286 |
| 2014/0249686 A1* | 9/2014 | Brainard | G05B 13/02 700/286 |
| 2015/0039145 A1* | 2/2015 | Yang | H02J 3/00 700/291 |

* cited by examiner

| 700 | GREEN | YELLOW | ORANGE | RED |
|---|---|---|---|---|
| 705 MICROGRID MODE | CONNECTED | MOSTLY ISLAND | ISLAND | ISLAND |
| 710 OPERATION | OPTIMAL | SUB-OPTIMAL | SUB-OPTIMAL | SURVIVAL |
| 715 TRACK WEATHER & SYSTEM STATE | NORMAL TRACKING | CLOSE TRACKING | CLOSE TRACKING | CLOSE TRACKING |
| 720 CONTROL STRUCTURE | CENTRALIZED | CENTRALIZED | PARTIALLY DECENTRALIZED | DECENTRALIZED |
| 725 MICROGRID CONTROL MODE | NORMAL | NORMAL | MONITORING ONLY | MG + MID-LEV MONITORING ONLY |
| 730 LOAD SHEDDING | NO | NO | PRECOMPUTE CONTROL ACTIONS | PERFORM LOAD SHEDDING |
| 735 REAL TIME RESERVE MARGIN | HIGH | LOW | MINIMUM | NONE |
| 740 SYSTEM BACKUP-LIKE STORAGE | NO | NO | IN USE | IN USE |
| 745 INSTRUCTIONS/SET POINTS | FROM MG CONTROLLER | FROM MG CONTROLLER | FROM MID-LEV CONTROLLER | COMP. CONTROL IN DROOP MODE |
| 750 COMM BETW MID-LEV CONTROLLERS | AS NEEDED | AS NEEDED | IF POSSIBLE | NOT POSSIBLE |

FIG. 7

FLEXIBLE CONTROL ARCHITECTURE FOR MICROGRID RESILIENCY

CROSS-REFERENCE TO RELATED APPLICATIONS

This application claims priority to U.S. Provisional Patent Application Ser. No. 61/982,593, entitled "FLEXIBLE CONTROL ARCHITECTURE FOR MICROGRID RESILIENCY," filed on Apr. 22, 2014, the contents of which are hereby incorporated by reference herein in their entirety.

BACKGROUND

1. Field of the Disclosure

This disclosure relates to microgrid electrical power distribution systems. Specifically, the disclosure addresses the resilient control of microgrids in response to overall conditions to which the microgrid is subjected.

2. Description of the Art

The term "microgrid" is defined as a group of interconnected loads and distributed energy resources (DER) within clearly defined electrical boundaries that act as a single controllable entity with respect to the grid and can connect and disconnect from the grid, operating in grid-connected or island mode.

Microgrid systems have been recognized as one of the primary technical approaches for improvements in the electrical grid's efficiency, reliability, and resiliency. The U.S. Department of Energy has indicated that microgrid systems will aid in meeting specific objectives for energy resilience, including protection of critical infrastructure and public resources. While it is expected that those objectives will vary depending on regional and other circumstances, the focus should be on strengthening the resilience of electrical infrastructure against adverse effects of future extreme weather phenomena and other unforeseen occurrences, so as to support efforts to prepare the nation for the impacts of climate change (as set forth in Executive Order 13653) and the goal of "building stronger and safer communities and infrastructure" in accordance with the President's Climate Action Plan.

In order to build a more resilient electrical grid it is necessary that microgrids that are supporting the main grid are themselves resilient. Due to its ability to continue operating when electricity delivered from a utility is disrupted, a microgrid is considered a strategic asset to support the planning and implementation of resilient energy communities. Microgrids can improve the ability of communities to adapt to changing conditions and withstand, respond to, and recover rapidly from disruptions caused by weather-related and other naturally occurring or unnatural events. The microgrid must be capable of managing its resources to meet the community-defined resilience objectives during disruptive events, and providing sufficient information to distribution system operators to enable the communication of accurate information on operating conditions of the microgrid to communities, especially those responsible for critical loads. The control architecture for such a microgrid is still an active area of research. During normal situations, centralized control architecture may be best for optimal operation of a microgrid. During abnormal conditions (e.g., a storm), however, a centralized control solution can suffer from a single point of failure. Further, too much computational time may be needed for determining and implementing new control actions to avert a dynamic situation transforming into a catastrophic scenario, and, in the case of communication failures, control operation may fail.

There is therefore a need in the art for a microgrid control architecture that does not have a single point of failure susceptible to extreme conditions.

There is furthermore a need for a microgrid control architecture that requires a minimum of computational time for determining and implementing new control actions to avert a developing dynamic situation transforming into a catastrophic scenario.

There is an additional need in the art for a microgrid control architecture that functions adequately in cases where communications connections between microgrid components are not functional. The control architecture should, however, provide advanced microgrid functions regarding efficiency, cost and conservation under normal operating conditions.

SUMMARY

Accordingly, it is therefore the object of the disclosure to provide a microgrid control architecture that does not have a single point of failure susceptible to extreme conditions, that requires a minimum of computational time for determining and implementing new control actions to avert a dynamic situation developing into a catastrophic scenario, and that functions adequately in cases where communications connections between microgrid components are not functional.

It is a further object of the disclosure to provide control architecture that provides advanced microgrid functions regarding efficiency, cost and conservation under operation in normal conditions.

Exemplary embodiments of the disclosure feature a control system for monitoring and controlling an electrical power microgrid including loads and distributed energy resources. The control system comprises a component control layer including component control devices connected directly to the loads and distributed energy resources, a middle level control layer including aggregating control devices, each aggregating control device being connected to a respective plurality of the component control devices, and a microgrid control layer including one or more microgrid control devices connected to the aggregating control devices and further comprising a contingency metric computation module for computing a contingency metric indicating a level of operational threat based on characteristics of the electrical power microgrid and its environment.

The control system is configured to operate in a centralized mode when the contingency metric indicates substantially no operational threat, wherein instructions and set points for the loads and distributed energy resources are transmitted from the microgrid control layer to the middle level control layer and the component control layer. The control system is further configured to operate in a decentralized mode when the contingency metric indicates a high operational threat, including operating the component control layer without receiving instructions and set points from the middle level control layer or the microgrid control layer.

The control system may further be configured to operate in one or more partially centralized modes when the contingency metric indicates an intermediate operational threat, wherein at least some instructions and set points for the loads and distributed energy resources are originated by the aggregating control devices and the electrical power microgrid is operated at least partially in island mode.

In another exemplary embodiment of the disclosure, a method is provided for controlling an electrical power microgrid including loads and distributed energy resources. The electrical power microgrid includes a control system comprising a component control layer including component control devices connected directly to the loads and distributed energy resources, a middle level control layer including aggregating control devices, each aggregating control device being connected to a respective plurality of the component control devices, and a microgrid control layer including one or more microgrid control devices connected to the aggregating control devices.

The method includes computing a contingency metric indicating a level of operational threat based on characteristics of the electrical power microgrid and its environment; operating in a centralized mode when the contingency metric indicates substantially no operational threat, including transmitting instructions and set points for the loads and distributed energy resources from the microgrid control layer to the middle level control layer and the component control layer; and operating in a decentralized mode when the contingency metric indicates a high operational threat, including operating the component control layer without receiving instructions and set points from the middle level control layer or the microgrid control layer.

The respective objects and features of the exemplary embodiments of the disclosure may be applied jointly or severally in any combination or sub-combination by those skilled in the art.

BRIEF DESCRIPTION OF THE DRAWINGS

The invention is explained in more detail with reference to an exemplary embodiment illustrated in a drawing, in which:

FIG. 7 is a table showing characteristics of the disclosed control architecture under four levels of operational threat, in accordance with embodiments of the disclosure.

Like parts are labeled with the same reference signs in all the figures.

DETAILED DESCRIPTION

Several microgrid control solutions have been proposed in academia and national laboratories. Most of them are from a microgrid design point of view rather than from the view point of a control architecture. One prominent example is Sandia National Lab's Energy Surety Microgrid (ESM) methodology, which is employed in the SPIDERS (Smart Power Infrastructure Demonstration for Energy Reliability and Security) project, where the objective is to demonstrate that microgrids developed using ESM methodology have the ability to maintain operational surety through secure, reliable, and resilient electric power generation and distribution to mission critical loads. This is still an ongoing project and the resiliency objectives have not yet been demonstrated.

Another example is the National Renewable Energy Laboratory's (NREL's) Continuous Optimized Reliable Energy (CORE) approach. Those approaches are microgrid design approaches which lead to a certain kind of control architecture. In those solutions, the control architecture itself is not flexible and hence can fail in severe conditions.

In general, nearly all the control solutions for microgrids that have been proposed in research publications try to design a static control architecture that intelligently utilizes the various assets of a microgrid (storage, DERs) and/or performs demand management during abnormal situations.

Figure 1:
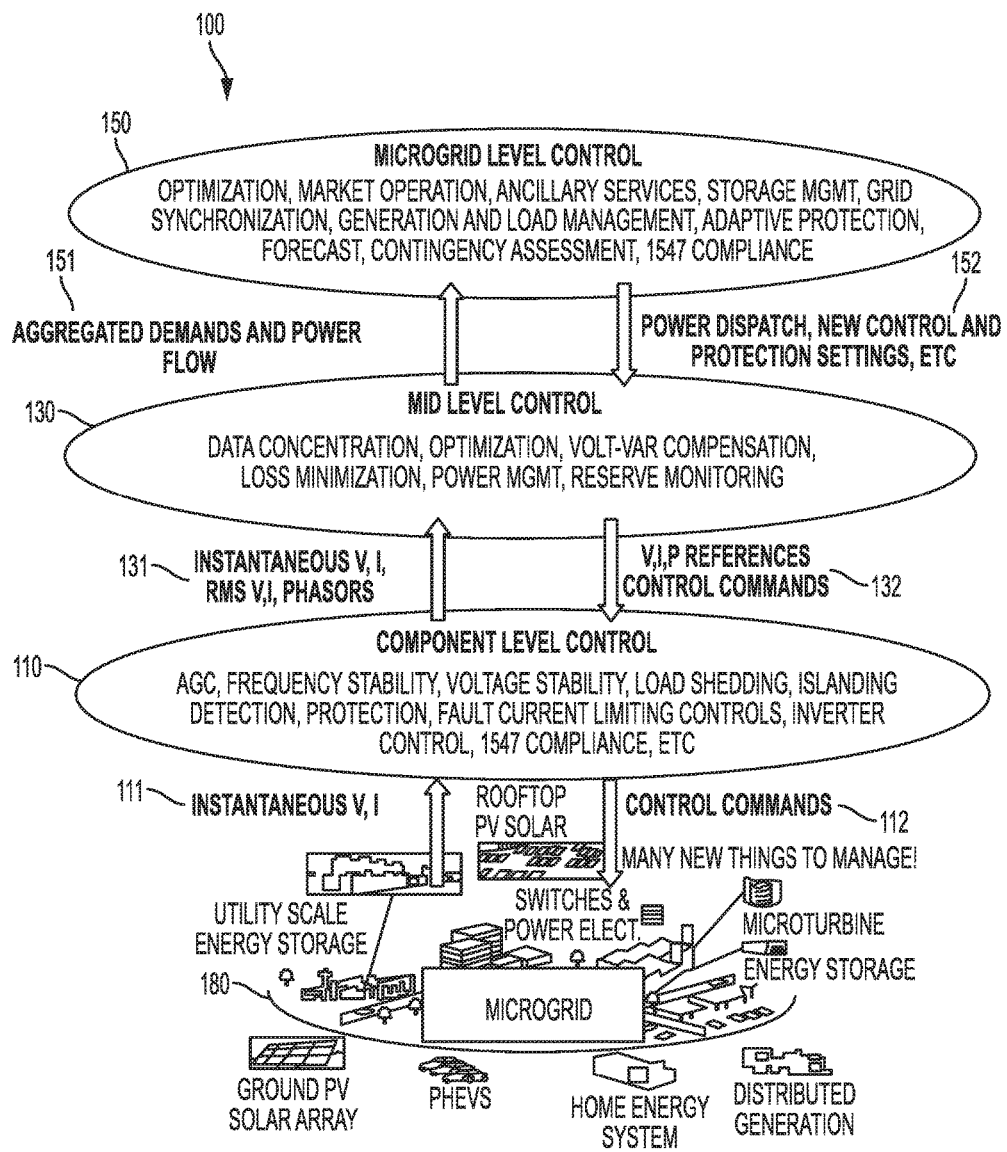
FIG. 1 is a schematic diagram showing a high-level architecture of an electrical microgrid control in accordance with embodiments of the disclosure.

To address the above mentioned issues, a flexible control architecture for a microgrid is presently disclosed. In the disclosed solution, the control architecture of the microgrid itself changes depending on a contingency or resiliency metric, which is defined below. A proposed high level control architecture 100 for the microgrid is shown in FIG. 1. The control architecture comprises three layers. The first level or layer is a component control layer 110. That layer basically includes control devices that are directly attached to system DERs and loads in the physical microgrid assets 180. Examples of such control devices include the inverters in front of individual storage or photovoltaic resources, controllers for any traditional generators, load control devices, etc. A controller at the component control layer 110 is responsible for functions such as automatic generation control (AGC), frequency stability, voltage stability, load shedding, islanding detection, protection, fault current limiting controls, inverter control, compliance with IEEE standard 1547, droop controls, etc. The functionality of a controller at the component control layer 110 is directed only towards the equipment controlled by the controller. The control devices in the component control layer 110 receive instantaneous feedback data such as voltage and current measurements 111 from the physical microgrid assets 180, and transmit control commands 112 to the physical microgrid.

The middle level control layer 130 comprises aggregating controllers that are responsible for aggregated DERs and loads within a geographical region. An example of such a controller is a device that is upstream of a community that includes several homes that have photovoltaic cells (PVs), a community battery storage, sectional switches (breakers) and loads (some of them controllable). Another example is a controller for a hospital that can control the hospital load, a battery storage, a backup generator, and a transfer switch. The aggregating controller can monitor instantaneous data 131 from the component level control layer 110 and can send control commands 132 (when required) to individual component control devices at the component level 110. An aggregating controller is responsible for functions such as optimization, Volt-var compensation, loss minimization, power management, etc. That functionality of the aggregating controllers is directed towards the downstream equipment controlled by the controller. Also, when required, an aggregating controller in the middle level control layer 130 is able to communicate with neighboring aggregating controllers. That communication is facilitated via a controller at the microgrid layer 150.

The topmost layer is a microgrid control layer 150 that basically comprises a microgrid controller or a plurality of interconnected microgrid controllers. That controller is responsible for intentional islanding, DER and load dispatch, optimization, load scheduling, planning, market operation, ancillary services, storage management, grid synchronization, generation and load management, adaptive protection, contingency assessment, compliance with IEEE standard 1547, etc. The microgrid controller may monitor aggregated demands, power flow and other data 151 from the middle level control layer 130. The microgrid controller may send control command 152 (when required) to individual controllers at middle and component layer, including power dispatch, new control and protection settings, etc. The microgrid control layer 150 is also responsible for computation of a contingency metric, and performs generation, load, and weather forecasting. The microgrid control layer also computes predictions of near future system states. It monitors the whole system and decides the suitable control architecture for the system.

Figure 2:
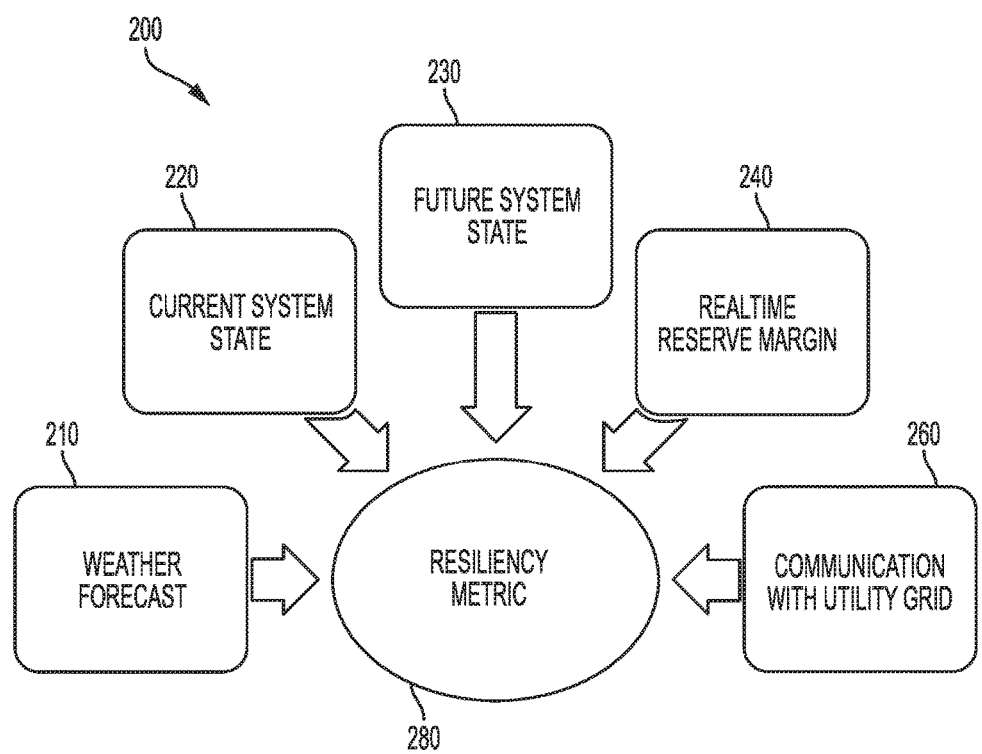
FIG. 2 is a flow chart illustrating computation of a contingency metric in accordance with embodiments of the disclosure.

The contingency or resiliency metric 280 is computed and monitored by the microgrid controller, using as inputs the characteristic shown in the diagram 200 of FIG. 2. The contingency metric 280 is a function of predicted threat level or future system state 230, current system state 220, weather forecast 210, real time reserve margin 240 and communications from the utility grid 260. The term "system" here refers to the microgrid system. The contingency metric 280 gives a measure of threat to the microgrid in its ability to maintain a stable and survivable operation.

Based on the contingency metric value 280, the system state is classified into a contingency level. In the present disclosure, four possible contingency levels are described. One skilled in the art will recognize that any number of contingency levels greater than 1 may be used. For example, the architecture may use a binary classification system in which the microgrid is operating either with no operational threat or with an operational threat. Alternatively, three contingency levels may be used: normal operation, medium threat and high threat. Other arrangements having other numbers of contingency levels may be used without departing from the spirit and scope of the disclosure.

In the presently disclosed microgrid control system, four contingency levels are used, with a highest threat being assigned a contingency metric value of 1, and no threat being assigned a value of 0. Based on those limits and based on the expected relationships among the contingency levels, the following contingency level classes are assigned:
Contingency metric≤0.15→Contingency Level: Green
0.15<Contingency metric≤0.3→Contingency Level: Yellow
0.3<Contingency metric≤0.8→Contingency Level: Orange
0.8<Contingency metric→Contingency Level: Red
The values demarcating the contingency level classes in a microgrid may be adjusted in practice based on empirical data, and on the composition and electrical layout of the microgrid.

Figure 3:
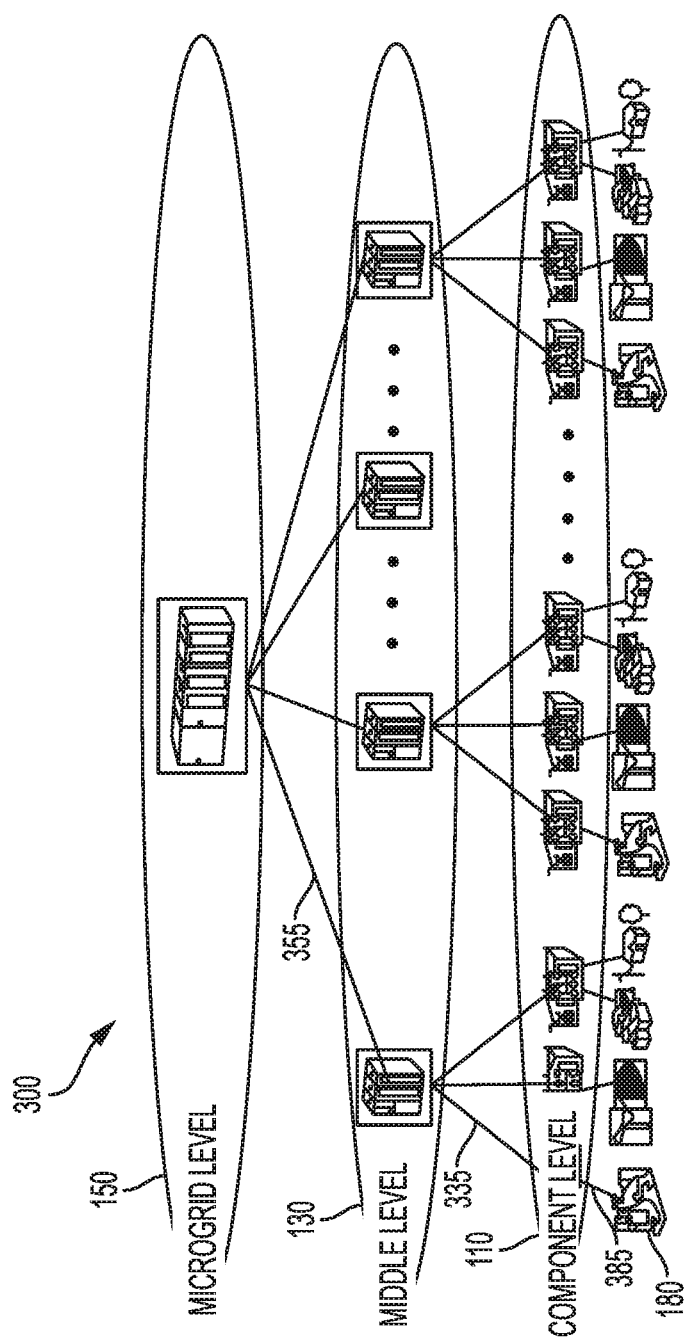
FIG. 3 is a schematic diagram showing the electrical microgrid control architecture in a centralized operating mode in accordance with embodiments of the disclosure.

Based on the contingency level computed at the topmost or microgrid control layer 150 (FIG. 1), the microgrid control architecture is modified such that the system is resilient to any threats that can affect system operation and the system's ability to supply energy to high priority loads. FIGS. 3-6 show the changes in control architecture based on the determined contingency level. The green contingency level 300, resulting in the high level (logical) control architecture shown in FIG. 3, is a contingency level in which the threat is very low. In that mode, the microgrid control architecture has following features:
  The microgrid is mostly in grid connected mode, in which it communicates with the utility power grid.
  Operation is optimal.
  The control is completely centralized.
  The system maintains high real time reserve margin.
  Microgrid can provide ancillary services to the main grid.
  Middle and component layer controllers receive instructions and set points from microgrid controller.

In FIG. 3, the lines 385 between the component layer 110 and the physical microgrid assets 180 are power lines and the remaining lines in the figure are communication lines. The lines 335, 355 represent strong control from top to bottom, which basically shows a tight, centralized control system.

Figure 4:
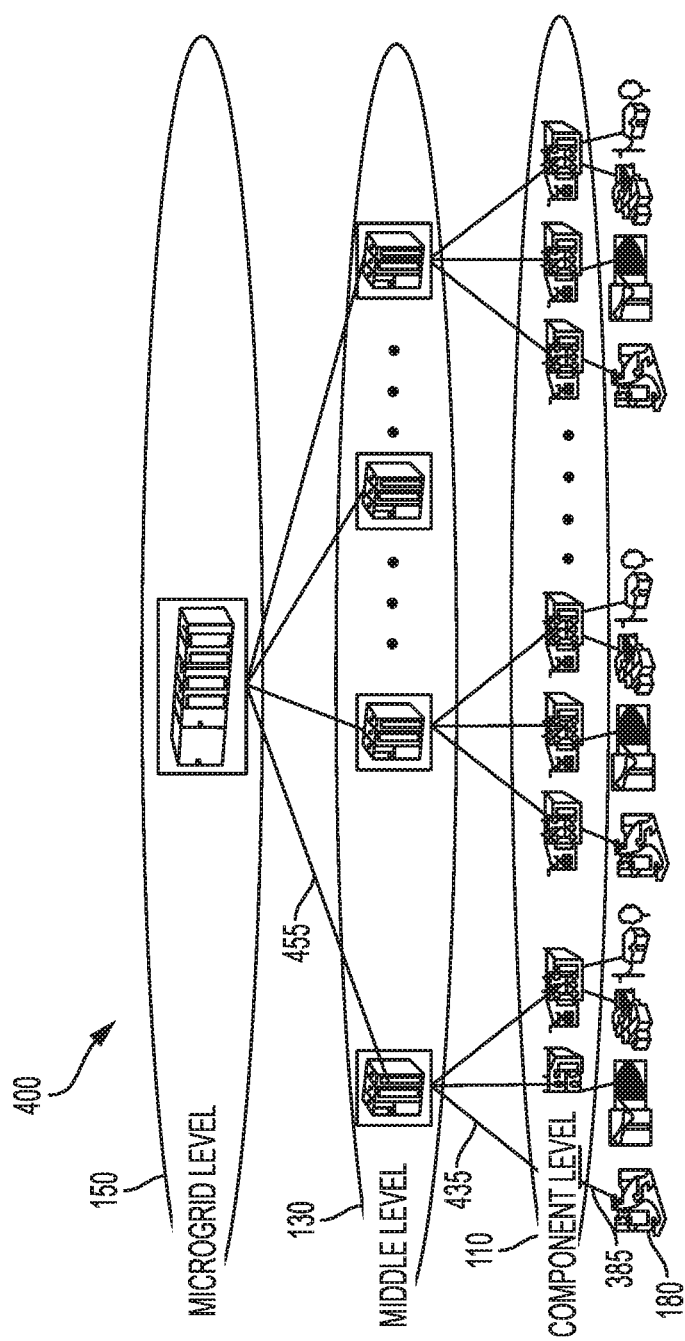
FIG. 4 is a schematic diagram showing the electrical microgrid control architecture in a first partially decentralized operating mode in accordance with embodiments of the disclosure.

When the contingency level changes to a yellow level, the control architecture changes to an architecture 400 shown in FIG. 4. The microgrid at that contingency level is mostly in an islanded mode of operation and utilizes microgrid resources to meet its operational needs.

While the control architecture is still centralized, the microgrid control layer 150 has a reduced role in the monitoring and controlling of individual controllers at the middle layer 130 and component layer 110. Instead, the microgrid control layer 150 moves toward strictly monitoring and tracking the current and future system state. While the communications lines 435 between the middle layer 130 and the component layer 110 maintain close communications, the communication lines 455 between the microgrid layer 150 and the middle layer 130 see reduced traffic as because high level control is reduced. In that mode of operation the microgrid control architecture has following features:
  The microgrid is mostly in island mode of operation.
  Operation is sub-optimal.
  Weather and future system state are closely tracked.
  The control is completely centralized.
  The system maintains low real time reserve margin.
  Middle and component layer controllers receive instructions/set points from the microgrid controller.

Figure 5:
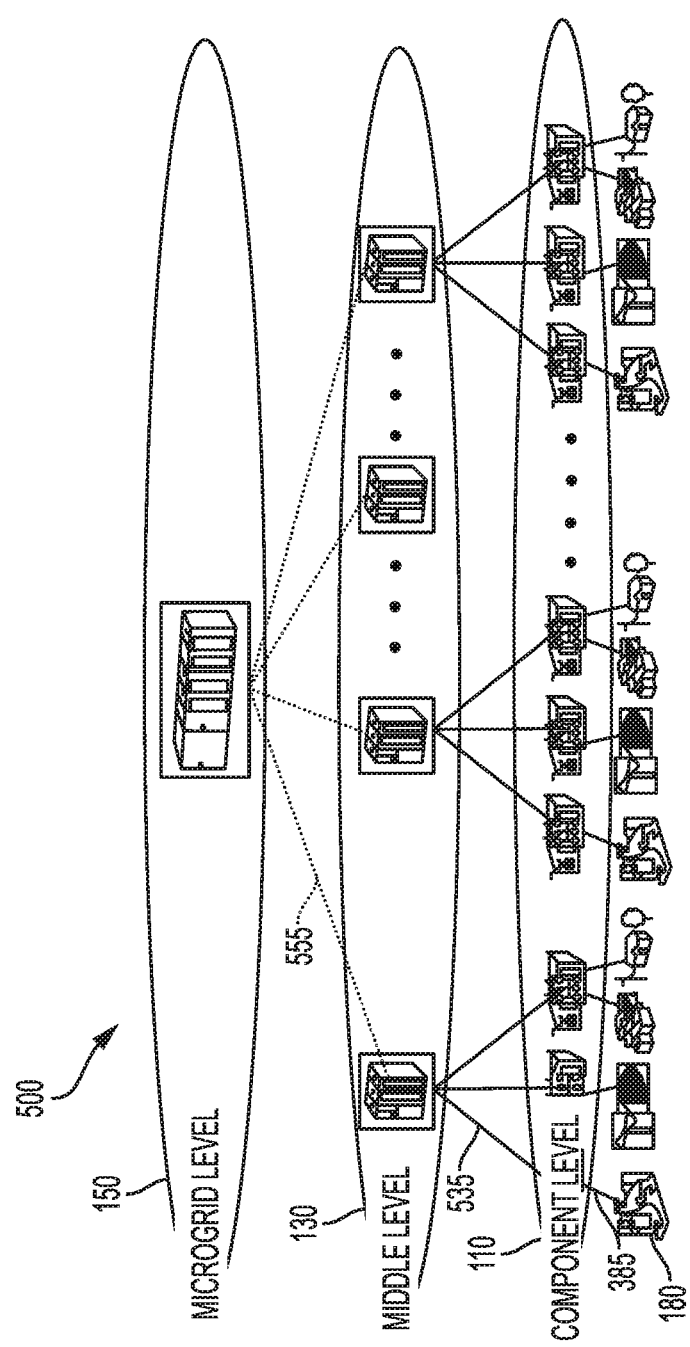
FIG. 5 is a schematic diagram showing the electrical microgrid control architecture in a second partially decentralized operating mode in accordance with embodiments of the disclosure.

If, based on the contingency metric, a high degree of threat is determined, due to a looming weather phenomenon or for any other reason, the system may enter an orange contingency level, and require the control architecture to change to the architecture 500 shown in FIG. 5. In that level the microgrid control layer 150 cedes command to controllers in the lower layers 130, 110, and the microgrid control layer only monitors and records their activities, as shown by dotted communication lines 555. In that case the middle control layer 130 takes responsibility in monitoring and controlling the microgrid physical assets 180 via controllers in the component layer 110 and communications lines 535. In that arrangement, even if a communication network failure leads to the microgrid control layer 150 being unable to send control commands (or any other information) to downstream controllers, the microgrid system will keep functioning albeit with sub-optimal performance. That will lead to increased resiliency of the microgrid system. In effect, the microgrid system is divided into smaller microgrid sub-units, controlled by individual aggregating controllers in the middle layer 130 that can operate on their own. Also, when required, those microgrid sub-units in layer 130 may be able to contact a neighboring microgrid unit, via microgrid controller layer (via lines 555), for support. In that mode, the microgrid architecture will have following features:

The microgrid is in island mode.
Operation is sub-optimal.
Weather and future system state are closely tracked.
The control is partially decentralized.
The microgrid controller in monitoring-only mode.
The microgrid controller undertakes pre-computation of control actions for load shedding.
The system maintains minimum real time reserve margin.
System backup-like storage is in use.
The component layer controller may receive instructions/set points from the middle layer controller.
If required and if possible, neighboring middle level controllers communicate with each other via the microgrid controller.

Figure 6:
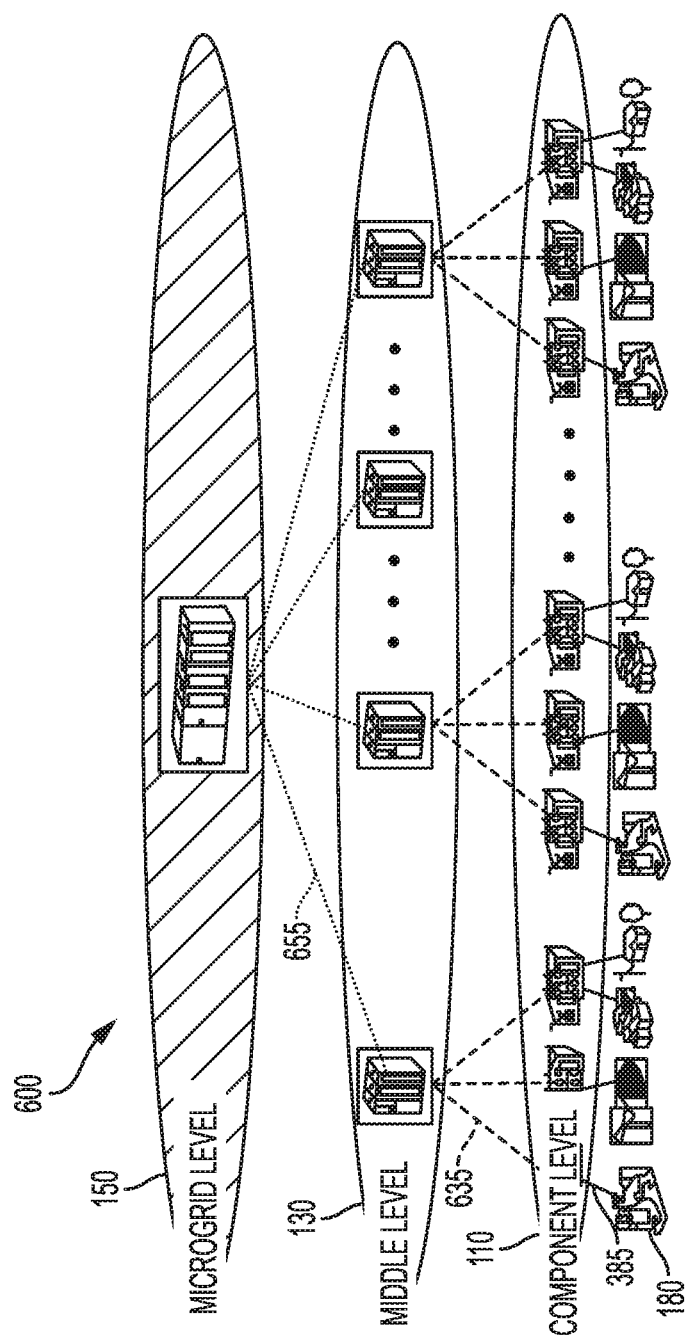
FIG. 6 is a schematic diagram showing the electrical microgrid control architecture in a completely decentralized operating mode in accordance with embodiments of the disclosure.

If the threat level is very high, the red contingency level is assigned. In that condition, the control architecture 600, shown in FIG. 6, is completely de-centralized. Both the microgrid control layer 150 and the middle control layer 130 only monitor and record but do not send any command to a lower layer controller. The communication lines 655, 635 are therefore used only for monitoring and recording, and not for controlling. The controllers in the component layer 110 may be placed in a droop mode of control to keep the system voltage and frequency within prescribed limits. Automatic load shedding is implemented to keep the system serving at least the highest priority loads. In this mode the microgrid system performance will be quite suboptimal but the system will be highly resilient as it can withstand not only multiple communication failures but also multiple electrical faults. In red contingency level, or the highest threat level, the microgrid control architecture has following features:

The microgrid is in island mode.
Operation is for survival.
Weather and future system state are closely tracked.
The control is decentralized.
The microgrid controller and the middle layer controllers are in monitoring-only mode
Load shedding is performed.
The system maintains no real time reserve margin; all reserves and storage are in use.
The component layer controller is placed in droop mode.

Once the threat level decreases, as determined by the contingency metric, the microgrid controller at the microgrid level 150 will initiate the process of re-establishing an appropriate control architecture. In the case where the microgrid controller 150 is disabled or not able to communicate with middle level controllers 130 (due to severe communication failure of the lines 655), the system is manually operated until all the failures are cleared and communication is reestablished.

A table 700 summarizing the various features of each of the four contingency levels, green, yellow, orange and red, is shown in FIG. 7. The microgrid controller, shown in line 705, is connected to the utility grid at the green contingency level, operates in mostly island mode at the yellow level, and operates in island mode at the orange and red levels. Overall operation of the microgrid, as shown in line 710, is optimal at the green contingency level, sub-optimal at the yellow and orange levels and operates for survival only at the red level. The weather and system state, shown in line 715, are tracked normally at the green contingency level and are tracked closely at all other levels. The overall control structure, shown in line 720, changes from a centralized structure at the green and yellow contingency levels, to a partially decentralized structure at the orange level and a decentralized structure at the red level.

The microgrid operates in a normal control mode at the green and yellow contingency levels, and changes to a monitoring-only mode at the orange level, as shown at line 725. At the red level, both the microgrid controller and the mid-level controllers operate in a monitoring-only mode. Line 730 shows that load shedding is not required at the green and yellow levels (although it may be implemented for other reasons such as peak demand reduction). At the orange contingency level, the microgrid controller performs a pre-computation of load shedding control actions, and at the red level, load shedding is implemented according to those precomputed control actions.

High levels of real time reserve margin are maintained by the system at the green contingency level, as shown in line 735. Only low levels are maintained at the yellow level, and only minimum levels are maintained at the orange level. At the red contingency level, the microgrid controller maintains no real time reserve margin. As shown in line 740, the control system uses a system backup-like storage at the orange contingency level and, if possible, at the red contingency level.

At the green and yellow contingency levels, instructions and set points are transmitted by the microgrid controller layer to the middle layer and the component layer, as shown in line 745. At the orange level, the instructions and set points are transmitted by the middle layer controller. At the red contingency level, the component controllers operate in a droop control mode, without receiving instructions and set points from upstream.

As noted in line 750, if possible and if required, neighboring middle layer controllers may communicate with each other via the microgrid controller at the orange contingency level. Such communications takes place under normal operations at the green and yellow levels.

Figure 8:
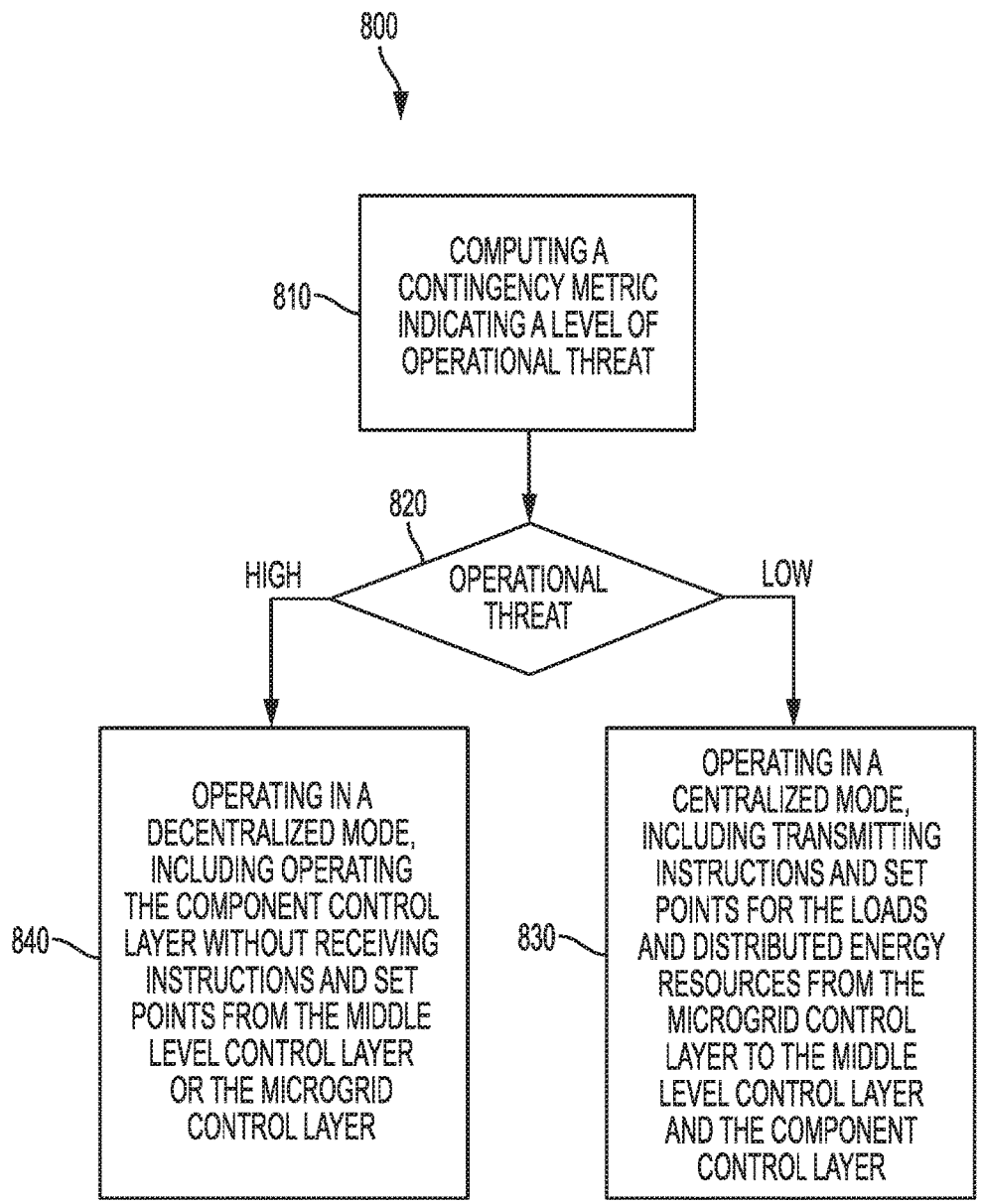
FIG. 8 is a flow chart showing a method in accordance with embodiments of the disclosure.

A flow chart 800, shown in FIG. 8, illustrates one method in accordance with the present disclosure. The method is for controlling an electrical power microgrid including loads and distributed energy resources. At block 810, the method computes a contingency metric indicating a level of operational threat, based on characteristics of the electrical power microgrid and its environment. The contingency metric may be based on one or more of a predicted threat level or future system state, a current system state, a weather forecast, communications from the utility grid, and real time reserve margin.

The computed contingency metric may be a value from 0 to 1, with a higher value indicating a greater risk or operational threat level. Based on the threat level, a decision 820 is made to operate under one of a plurality of modes. In the example 800 of FIG. 8, two modes are used: a decentralized mode and a centralized mode. More operational modes, such as three or four modes, may be used. Each mode is assigned a range of the computed contingency metric.

In the two-mode example shown, if the operational threat is low, the system is operated at block 830 in a centralized mode. In the centralized mode, instructions and set points for the loads and distributed energy resources are transmitted from the microgrid control layer to the middle control layer and the component control layer.

If the operational threat is high, the system is operated at block 840 in a decentralized mode, including operating the component control layer without receiving instructions and set points from the middle level control layer or the microgrid control layer.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A control system for controlling an electrical power microgrid including loads and distributed energy resources, the control system comprising:
    a component control layer including component control devices connected directly to the loads and distributed energy resources;
    a middle level control layer including aggregating control devices, each aggregating control device being connected to a respective plurality of the component control devices;
    a microgrid control layer including one or more microgrid control devices connected to the aggregating control devices and further comprising a contingency metric computation module for computing a contingency metric indicating a level of operational threat based on characteristics of the electrical power microgrid and its environment;
    the control system being configured to operate in a centralized mode when the contingency metric indicates substantially no operational threat, wherein the electrical power microgrid communicates with a main grid, instructions and set points for the loads and distributed energy resources are transmitted from the microgrid control layer to the middle level control layer and the component control layer, and the control system maintains a first level of real time reserve margin;
    the control system being further configured to operate in a first intermediate mode when the contingency metric indicates a first intermediate operational threat, wherein the electrical power microgrid is operated partially in an island mode, the instructions and set points for the loads and distributed energy resources are transmitted from the microgrid control layer to the middle level control layer and the component control layer, and the control system maintains a second level of real time reserve margin, wherein the second level of real time reserve margin is lower than the first level of real time reserve margin;
    the control system being further configured to operate in a second intermediate mode when the contingency metric indicates a second intermediate operational threat greater than the first intermediate operational threat, wherein the electrical power microgrid is operated in the island mode, the instructions and set points for the loads and distributed energy resources are transmitted from the middle level control layer to the component control layer without receiving instructions and set points from the microgrid control layer, and the control system maintains a minimum real time reserve margin;
    the control system being further configured to operate in a decentralized mode when the contingency metric indicates a high operational threat, wherein the electrical power microgrid is operated in the island mode, the component control layer is operated without receiving instructions and set points from the middle level control layer or the microgrid control layer, and the control system maintains no real time reserve margin.

2. The control system of claim 1, wherein the characteristics of the electrical power microgrid and its environment upon which the contingency metric is based include a weather forecast.

3. The control system of claim 1, wherein the characteristics of the electrical power microgrid and its environment upon which the contingency metric is based include communications from the main grid.

4. The control system of claim 1, wherein the characteristics of the electrical power microgrid and its environment upon which the contingency metric is based include each of the following characteristics: a current state, a predicted state and a reserve level.

5. The control system of claim 1, wherein the control system is further configured to implement load shedding when the control system is operating in the decentralized mode.

6. The control system of claim 5, wherein the control system is further configured to precompute control actions for load shedding when the contingency metric indicates an increasing operational threat.

7. The control system of claim 1, wherein the decentralized mode includes the performance of monitoring functions without supervisory functions by the microgrid control layer and the middle level control layer.

8. A method for controlling an electrical power microgrid including loads and distributed energy resources, electrical power microgrid including control system comprising a component control layer including component control devices connected directly to the loads and distributed energy resources, a middle level control layer including aggregating control devices, each aggregating control device being connected to a respective plurality of the component control devices, and a microgrid control layer including one or more microgrid control devices connected to the aggregating control devices, the method comprising:
    computing a contingency metric indicating a level of operational threat based on characteristics of the electrical power microgrid and its environment;
    operating the control system in a centralized mode in response to the contingency metric indicating substantially no operational threat, wherein the electrical power microgrid communicates with a main grid, instructions and set points for the loads and distributed energy resources are transmitted from the microgrid control layer to the middle level control layer and the component control layer, and the control system maintains a first level of real time reserve margin;
    operating the control system in a first intermediate mode in response to the contingency metric indicating a first intermediate operational threat, wherein the electrical power microgrid is operated partially in an island mode, the instructions and set points for the loads and distributed energy resources are transmitted from the microgrid control layer to the middle level control layer and the component control layer, and the control system maintains a second level of real time reserve margin, wherein the second level of real time reserve margin is lower than the first level of real time reserve margin;

operating the control system in a second intermediate mode in response to the contingency metric indicating a second intermediate operational threat greater than the first intermediate operational threat, wherein the electrical power microgrid is operated in the island mode, the instructions and set points for the loads and distributed energy resources are transmitted from the middle level control layer to the component control layer without receiving instructions and set points from the microgrid control layer, and the control system maintains a minimum real time reserve margin;

operating the control system in a decentralized mode in response to the contingency metric indicating a high operational threat, wherein the electrical power microgrid is operated in the island mode, the component control layer is operated without receiving instructions and set points from the middle level control layer or the microgrid control layer, and the control system maintains no real time reserve margin.

9. The method of claim 8, wherein the characteristics of the electrical power microgrid and its environment upon which the contingency metric is based include a weather forecast.

10. The method of claim 8, wherein the characteristics of the electrical power microgrid and its environment upon which the contingency metric is based include communications from the main grid.

11. The method of claim 8, wherein the characteristics of the electrical power microgrid and its environment upon which the contingency metric is based include each of the following characteristics: a current state, a predicted state and a reserve level.

12. The method of claim 8, further comprising:
implementing load shedding when the control system is operating in the decentralized mode.

13. The method of claim 12, further comprising:
precomputing control actions for load shedding when the contingency metric indicates an increasing operational threat.

14. The method of claim 8, wherein operating in the decentralized mode further includes:
by the microgrid control layer and the middle level control layer, performing monitoring functions without performing supervisory functions.

* * * * *